United States Patent [19]

Malik

[11] Patent Number: 5,465,804

[45] Date of Patent: Nov. 14, 1995

[54] COMBINATION OF A POWER STEERING PUMP AND AIR CONDITIONING COMPRESSOR IN AN AUTOMOTIVE VEHICLE

[75] Inventor: John S. Malik, New Braunfels, Tex.

[73] Assignee: T. B. Wood's Sons Company, Chambersburg, Pa.

[21] Appl. No.: 231,802

[22] Filed: Apr. 25, 1994

[51] Int. Cl.⁶ ............................................. F16D 3/52
[52] U.S. Cl. .................. 180/133; 417/364; 464/69; 464/99; 62/323.4
[58] Field of Search ..................... 403/337; 464/99, 464/69; 417/364; 180/133; 62/323.4

[56] References Cited

U.S. PATENT DOCUMENTS

| 3,954,147 | 5/1976 | Hollins | 180/133 |
| 4,055,966 | 11/1977 | Fredericks | 464/99 |
| 4,708,692 | 11/1987 | Weiss | 464/69 |
| 4,871,277 | 10/1989 | Fuchigami | 464/99 X |

*Primary Examiner*—Richard E. Gluck
*Attorney, Agent, or Firm*—Frank S. Troidl

[57] ABSTRACT

A power steering pump and air conditioning compressor are axially aligned. Power from the power steering pump is provided to the air conditioning compressor through a coupler. The coupler has two axially spaced flexible discs separated by a spacer.

3 Claims, 4 Drawing Sheets

COMBINATION OF A POWER STEERING PUMP AND AIR CONDITIONING COMPRESSOR IN AN AUTOMOTIVE VEHICLE

BACKGROUND OF THE INVENTION

1. Field of the Invention

This invention relates to automotive vehicles. More particularly this invention is a new combination or arrangement of a power steering pump, air conditioning compressor, and a coupling for delivering power from the power steering pump to the air conditioning compressor.

More and more accessory and auxiliary equipment is being used in automobiles and other vehicles. Therefore it is becoming increasingly important that the accessories and auxiliary equipment take up as little space as reasonably possible. It is also very important that the equipment be as light as possible and still do the desired job. Many automotive vehicles have a power steering pump and an air conditioning compressor. The pump and compressor have been belt driven with the equipment located at the front of the engine in line with the other belt driven equipment. In some applications, there is not enough space to do this. The equipment has to then be mounted in line. The power steering pump delivers power to the air conditioning compressor. A coupling inter-connects the power steering pump and the air conditioning compressor. Usually the power steering pump has an output shaft and a coupling is connected to the output shaft. The coupling transmits the power from the power steering pump output shaft to the air conditioning compressor.

A highly important part of the combination of the power steering pump, and air conditioning compressor is the coupling. Not only must the coupling provide power to the air conditioning compressor from the power steering pump but it has the important function of accommodating misalignment between the connected shafts. The coupling must be torsionally rigid and capable of accommodating angular, axial, and parallel offset misalignments.

2. Description of Prior Art

With this invention the air conditioning compressor is not belt driven. Our combination of elements results in a 100% efficiency while belted drives experience frictional power losses. The high radial loads of the belted drives and their affects on bearings and the equipment are eliminated. Radial loads are a prime concern in current air conditioner compressor clutch designs. Because of space limitations attempts have been made in the past to place an air conditioning compressor in line behind the power steering pump. However, problems have arisen with regard to the testing of the combination of the power steering pump, air conditioning compressor, and coupling. The coupling was a rubber doughnut type flex element bolted directly to the drive cup of the air conditioning compressor. The other side of the doughnut was bolted to an extension shaft. The pump end of the shaft had a female spline engaged to the male splined shaft. The rubber coupling was designed to take angular and parallel misalignment when the shafts are close together. The wide spacing between the shafts caused parallel misalignment to be accommodated as angular deflection at the spline engagement. Torsional wind-up in the rubber coupling caused the drive cup to unscrew when there was a change in torque. Obviously this was unsatisfactory.

SUMMARY OF THE INVENTION

This invention has the advantage over the prior art in that it provides higher torsional stiffness than the prior art and this eliminates the unscrewing problem on the drive cup. The coupling portion of the new combination of the power steering pump, coupling and air conditioning compressor is constructed to provide minimum weight and costs.

Briefly described, this invention comprises a power steering pump, and an air conditioning compressor axially aligned with the power steering pump. Means are provided to inner-connect the power steering pump and the air conditioning compressor to deliver power from the power steering pump to the air conditioning compressor. The inter-connecting means comprises two axially spaced flexible disc separated by a spacer.

BRIEF DESCRIPTION OF THE DRAWINGS

The invention as well as its many advantages may be further understood by reference to the following detailed description, and drawings in which.

DESCRIPTION OF THE PREFERRED EMBODIMENT

In the various figures, like parts are referred to by like numbers.

Figure 1:
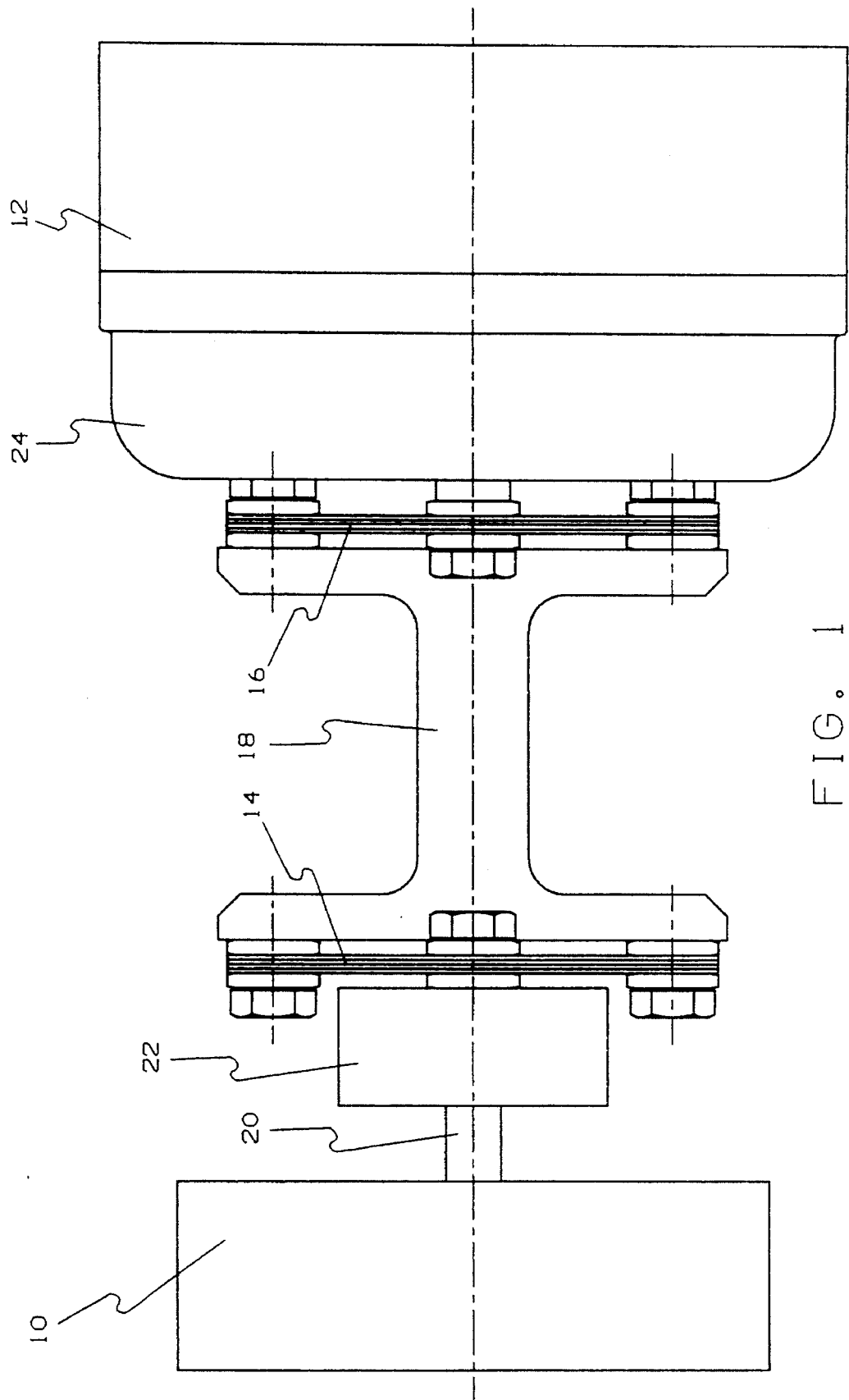
FIG. 1 is an elevational view of our new combination.

Referring to the drawings and particularly to FIG. 1, the invention includes a power steering pump 10 (shown diagrammatically) and an air conditioning compressor 12 (also shown diagrammatically) which is axially aligned with the power steering pump. The power steering pump 10 delivers power to the air conditioning compressor 12. The means for coupling the power steering pump 10 and the air conditioning compressor 12 comprises two axially spaced flexible discs 14 and 16 separated by an H-shaped spacer 18.

An output shaft 20 extends from the power steering pump 10 and into an input hub 22. A drive cup 24 is connected to the air conditioning compressor 12.

The flexible disc 14 is connected to the input hub 22 and the spacer 18. The other flexible disc 16 is connected to the spacer 18 and the air conditioning drive cup 24. Preferably, each flexible disc 14 and 16 consists of laminated flex elements having an even number of circumferentially separated holes on a common radius.

Figure 2:
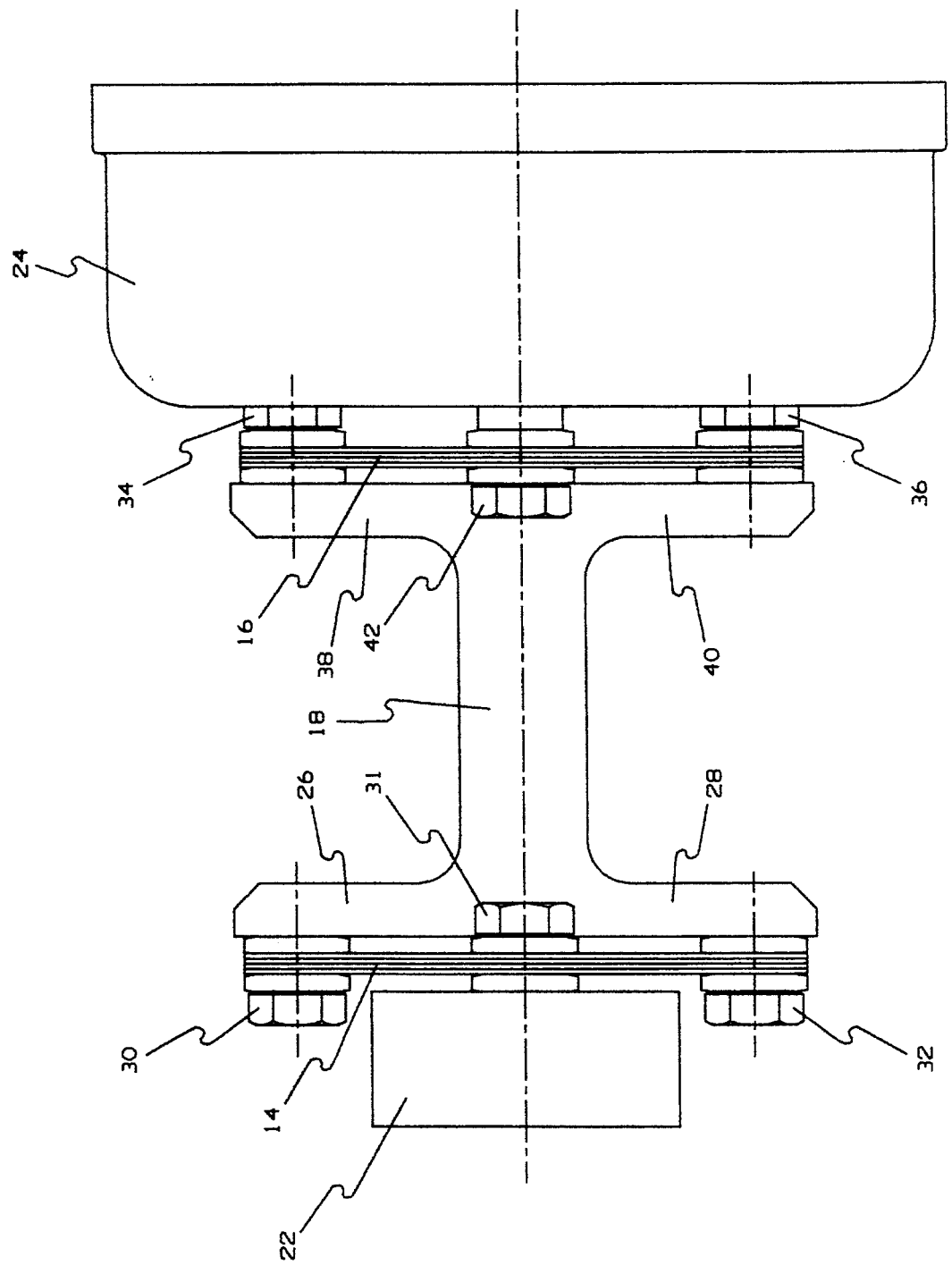
FIG. 2 is a view of a portion of FIG. 1 and showing the input hub, flexible disc coupling, and drive cup.
Figure 3:
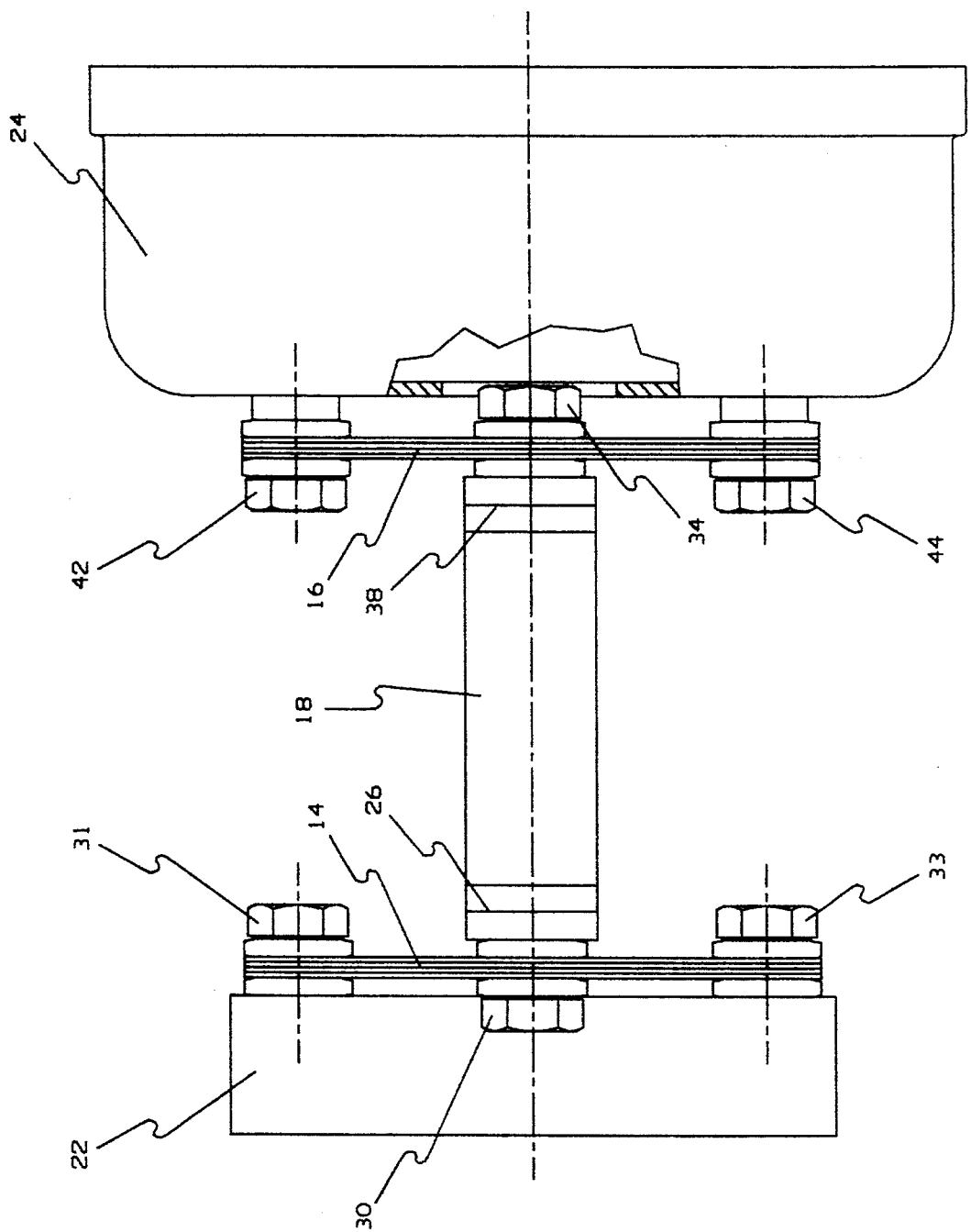
FIG. 3 is a top view of the elements shown in FIG. 2.

As shown in FIG. 2 the flexible disc 14 is connected to vertical portions 26 and 28 of the H-shaped spacer by bolts 30 and 32. As shown in FIG. 3 the flexible disc 14 is connected to the input hub 22 by the bolts 31 and 33.

As shown in FIG. 2 the flexible disc 16 is connected to the H-shaped spacer by bolts 34 and 36 extending into vertical portions 38 and 40 of the H-shaped spacer 18. As shown in FIG. 3 the flexible disc 16 is connected to the air conditioner drive cup 24 by bolts 42 and 44.

Figure 4:
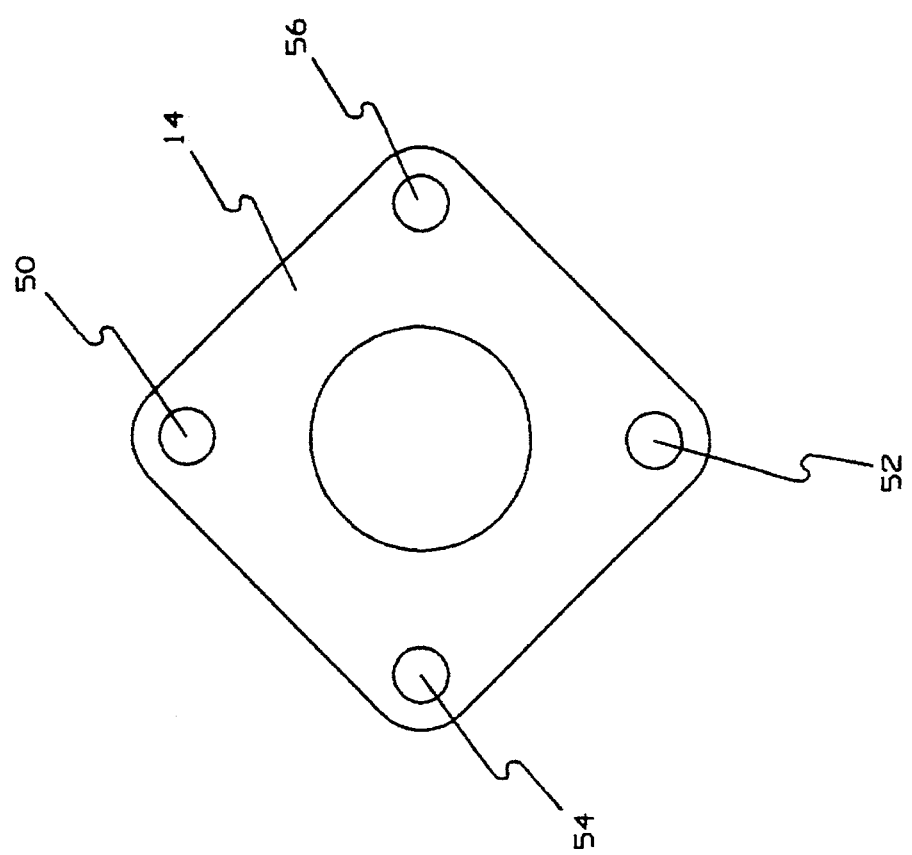
FIG. 4 shows a front view of the flexible disc.

FIG. 4 shows the laminated disc 14 as having four holes on a common radius. Holes 50 and 52 are bolted to the input hub 22. Holes 54 and 56 are bolted to the spacer 18. Thus it can be seen that circumferentially adjacent bolts connect alternately to the input hub and to the spacer. In a similar manner adjacent bolts connect the flexible discs alternately to the drive cup and to the spacer.

The flexible discs are preferably made of an assembly of thin stainless steel elements. The spacer may be made of a sintered powdered metal.

It is necessary that an even number of circumferentially separated holes on a common radius be provided on a flexible disc. In the preferred embodiment shown there are four holes. By placing the minimum number, four, of driving and driven bolts on a common radius the bending stresses in the flexible member caused by misalignment and axial float are minimized.

I claim:

1. In an automotive vehicle, the combination of:

a power steering pump;

an air conditioning compressor axially aligned with the power steering pump;

and means inter-connecting the power steering pump and the air conditioning compressor to deliver power from the power steering pump to the air conditioning compressor;

said means having two axially spaced flexible discs separated by a spacer.

2. The combination of claim 1 wherein the means inter-connecting the power steering pump and the air conditioning compressor comprises:

an output shaft extending from the power steering pump;

a drive cup connected to the air conditioning compressor;

an input hub connected to the power steering pump output shaft;

one flexible disc being connected to the input hub and to the spacer;

the other flexible disc being connected to the spacer and to the air conditioning compressor drive cup.

3. The combination of claim 2 wherein:

each flexible disc consists of laminated flex elements having an even number of circumferentially separated holes on a common radius;

a bolt extending through each hole;

means for connecting circumferentially adjacent bolts of one flexible disc alternately to the input hub and to the spacer; and means for connecting circumferentially adjacent bolts of the other flexible disc alternately to the drive cup and to the spacer.

* * * * *